United States Patent [19]

Williamson

[11] 4,449,590
[45] May 22, 1984

[54] ROW MARKER ARM ASSEMBLY

[75] Inventor: Gerald E. Williamson, Macomb, Ill.

[73] Assignee: Yetter Manufacturing Co., Colchester, Ill.

[21] Appl. No.: 420,800

[22] Filed: Sep. 21, 1982

[51] Int. Cl.³ .............................................. A01B 17/00
[52] U.S. Cl. .................................... 172/126; 172/456
[58] Field of Search ............... 172/126, 127, 128, 129, 172/130, 131, 132, 311, 456

[56] References Cited

U.S. PATENT DOCUMENTS

| | | | |
|---|---|---|---|
| 1,164,393 | 12/1915 | Randolph | 172/132 |
| 3,666,019 | 5/1972 | Yeske | 172/130 |
| 4,030,551 | 6/1977 | Boetto | 172/126 |
| 4,207,950 | 6/1980 | Kinzenbaw | 172/126 |
| 4,244,428 | 1/1981 | Sloan | 172/456 |
| 4,281,720 | 8/1981 | Tusing | 172/311 |
| 4,365,672 | 12/1982 | Robinson | 172/127 |

OTHER PUBLICATIONS

9000F Front Folding Planter Bar Advertizing Brochure of Carter Mfg. Co. Inc. Unionville, MD.

Drawn and Integral Planters–Advertizing Brochure of John Deere Moline, Ill. pp. cover 21 and 22.
Fold it Forward with Kelderman Fold Kits Advertizing Brochure of Kelderman Mfg. Inc. Oskaloosa, IA.
9000F Front Folding Planter Bar Advertizing Brochure of Carter Mfg. Co. Unionville, MO.

*Primary Examiner*—Richard J. Johnson
*Attorney, Agent, or Firm*—McWilliams, Mann, Zummer and Sweeney

[57] ABSTRACT

An agricultural row marker assembly is provided which includes a three-piece articulated arm and which is hydraulically actuated. The assembly has a base which is connectable to an agricultural tool bar. A second arm is pivotally mounted to the first arm and a telescopingly extendable third arm is pivotally connected to the second arm. A marker disc is located at the distal end of the third arm. The arm is hydraulically actuated with the hydraulic cylinder acting on the first arm through a link member. A second link runs from the base to the second arm and a cable runs between the second link and the third arm so that extension of the hydraulic cylinders extendable rod urges all three arms in the substantially linear alignment.

3 Claims, 5 Drawing Figures

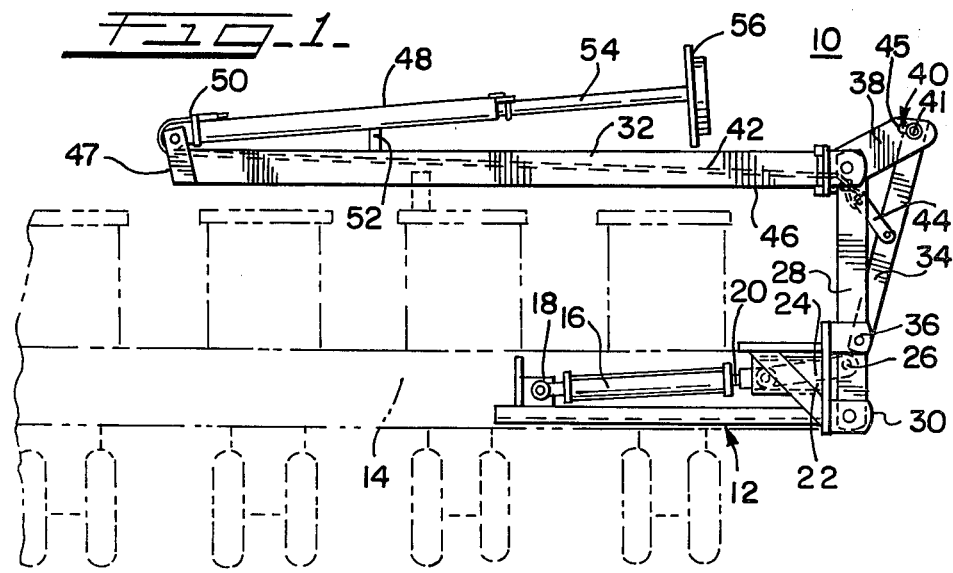
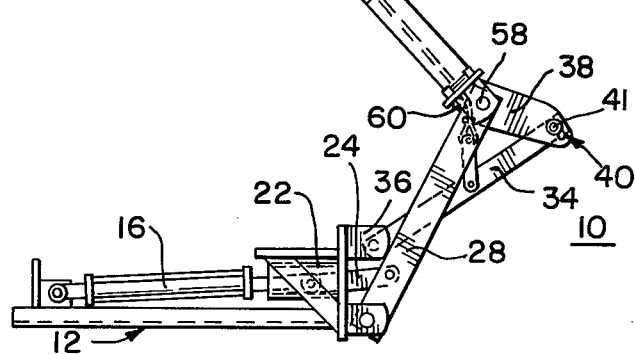

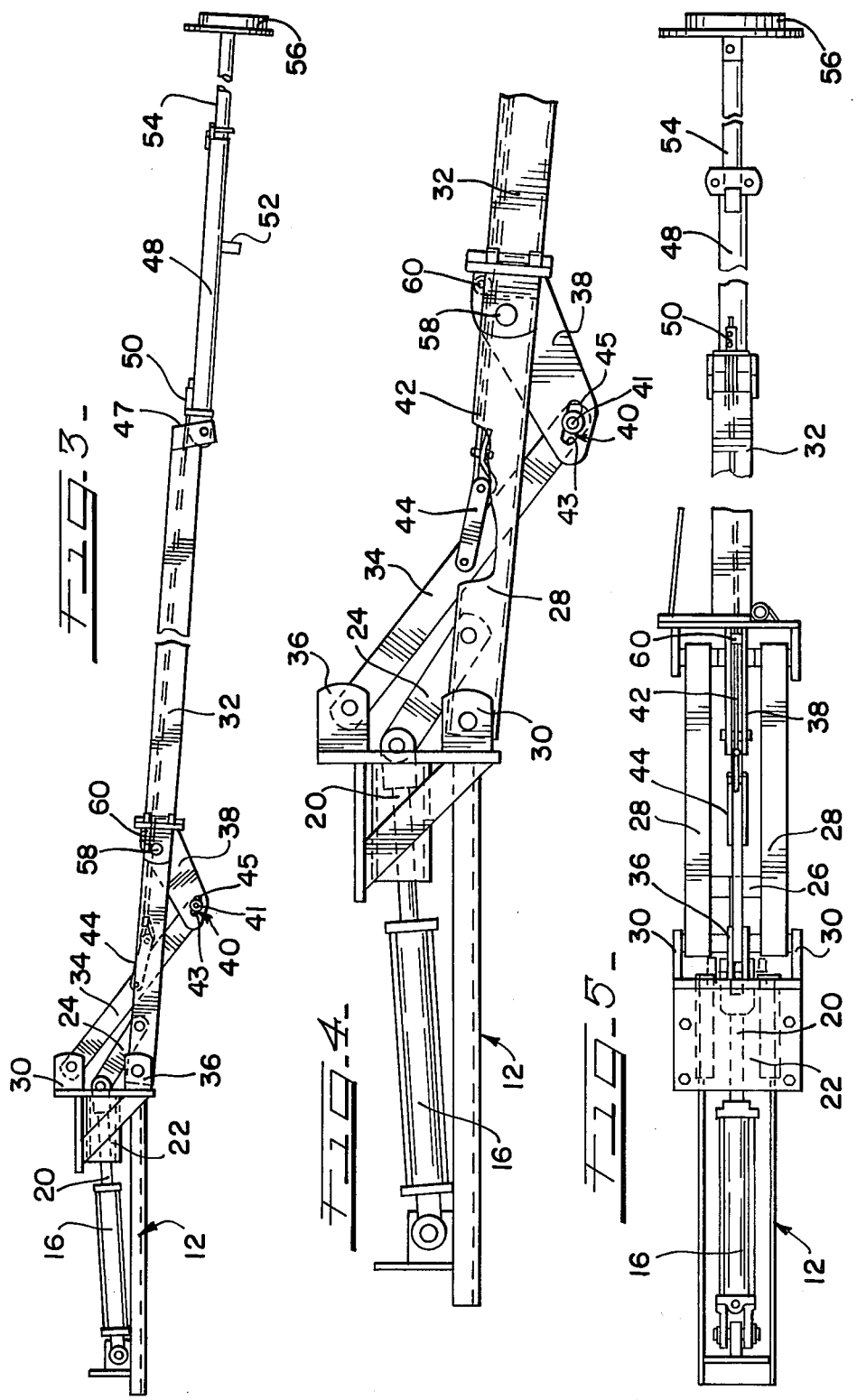

ROW MARKER ARM ASSEMBLY

BACKGROUND OF THE INVENTION

This invention relates to agricultural row marker assemblies, in particular, to such assemblies that are hydraulically actuated. Such row marker assemblies are attached to agricultural tool bars used for towing agricultural implements such as seed planters in gangs behind a mobile power source such as a tractor. To insure efficient planting patterns it is necessary that the tractor operator guide the tractor and gang of planters in a line parallel to and appropriately spaced from the last planted furrow. To accomplish this, an arm is extended to one or both sides of the gang. A disc at the end of each arm marks a line on the ground parallel to the planted furrows so that the same tractor or other tractors operating on the same field may be guided by the line or lines.

Row marker designs currently in use include those with hydraulically actuated two-piece arms which, when folded, generally extend upward posing clearance problems when transporting the equipment from field to field. Certain three-piece folding row markers have been used but generally these are manually rather than hydraulically operated.

The present invention provides a unit which when folded is extremely compact with a low overall height which provides a low center of gravity and prevents clearance problems when transporting the equipment.

SUMMARY OF THE INVENTION

It is the primary purpose of this invention to provide a row marker assembly which is hydraulically extendable and foldable, and when folded is very compact in height. This compactness is accomplished by its articulated design. The base of the unit includes a hydraulic cylinder, the operation of which is controlled from the tractor's cab. The cylinder and base are inserted into the end of a square section agricultural tool bar and are secured by U-bolts. That part of the base remaining outside of the tool bar consists of a bracket to which the assembly's first arm and a second link are pivoted. The first arm consists of two parallel longitudinal members. A first link pivotally connects the distal end of the hydraulic cylinder's extendable rod and an intermediate point on the first arm. A second arm, of tubular design is pivotally connected to the distal end of the first arm. A tail piece is fixed to the proximal end of the second arm and is connected to the unit's base by the previously mentioned second link. At a intermediate point on the second link is connected a cable which passes from the second link over a pulley at the juncture of the first and second arms and then passes through the tubular second arm to a point on the third arm which is itself pivotally connected to the distal end of the second arm. The third arm is telescopingly adjustable for length to adjust the length of the entire unit and thus the positioning of the line dug by the row marker disc, located at the distal end of the third arm.

DESCRIPTION OF THE DRAWINGS

FIG. 1 is a general front elevational view of an agricultural row marker embodying the present invention shown in its folded position and carried out a tool bar shown in phantom.

FIG. 2 is a front elevational view of the row marker assembly in its partially extended position.

FIG. 3 is a front elevational view of the row marker assembly in its fully extended position.

FIG. 4 is a detail view to larger scale, partially broken away of the base, first arm and linkage members of the row marker assembly.

FIG. 5 is a plan view of the row marker assembly in its extended position, partially broken away.

DESCRIPTION OF PREFERRED EMBODIMENT

The row marker assembly embodying the present invention is commonly used in pairs with gangs of agricultural implements carried by a tool bar attached to a tractor. These units are hydraulically controlled and one or the other or both of them may be extended in any particular application.

In FIG. 1 is illustrated a row marker assembly embodying the present invention, generally indicated as 10, in its folded position. Base member 12 is mounted within tool bar 14, shown in phantom. Hydraulic cylinder 16 is anchored to base member 12 at anchor 18. The cylinder's extendable rod 20 is disposed within channel 22 of base 12. First link 24 is pivotally attached to extendable rod 20 at one end and to first arm pivot point 26 of first arm 28 at the other end. First arm 28 comprising two parallel elongated members as seen in FIG. 5 is pivotally connected at its proximal end to lower base bracket 30. Distal end of first arm 28 is pivotally attached to proximal end of second arm 32 at pivot point 58. Second link 34 is pivotally connected to upper base bracket 36 and to tail piece 38 of second arm 32 at slot 40. This connection is effected through pivotal connection of pin 41 in slot 40, which includes outer end 43 and inner end 45. Cable 42, attached to second link 34 by cable link 44 passes over pulley 60, into second arm 32 and runs through the distal end 47 of that arm. Third arm 48 is pivotally connected at its proximal end to the distal end of second arm 32. Cable 42 is attached to third arm 48 at cable anchor 50. Arm rest 52 is provided on third arm 48 to abut second arm 32 in this position. Telescopic extension 54 extends from within arm 48 to provide a facility for length adjustment. Marking disc 56 is provided at the end of extension 54.

The views illustrated in FIGS. 1, 2 and 3 illustrate the operation of the assembly as it is extended. As hydraulic cylinder 16 is activated, rod 20 is extended through channel 22. First arm 28 is thus extended by first link 24 as shown in FIG. 2. This action pulls the distal end of first arm 28 downward. At the same time, second link 34 running from upper base bracket 36 to tail piece 38, maintaining a fixed distance between those two points, forces second arm 32 to pivot clockwise about pivot point 58. As this occurs and second arm 32 is urged into alignment with first arm 28, the scissors action of first arm 28 and second link 34 applies tension to cable 42 through link 44. Cable 42 then engages pulley 60 and tension is applied to cable anchor 50, fixed to third arm 48 which is thus pulled into alignment with the other two arms.

In the extended position shown in FIG. 3, marking disc 56 is free to float over surface irregularities because pin 41 is free to slide within slot 40. As disc 56 encounters a high spot on the field, arms 32 and 48 are deflected upward and tail piece 38 is pivoted counterclockwise until pin 41 is disposed at outer end 43 of slot 40. Conversely, when disc 56 encounters a low spot the second and third arms drop, pivoting tail piece 38 clockwise until pin 41 abuts inner end 45 of slot 40.

To fold the marker assembly, rod 20 is withdrawn into hydraulic cylinder 16 which pulls first link 24 into channel 22. This urges first arm 28 toward its upright position as in FIG. 1. Simultaneously, second arm 32 is pivoted counterclockwise about pivot point 58 and tension on cable 42 urges pin 41 on second link 34 to inner end 45 of slot 40 in tail piece 38. Since pin 41 is no longer free to slide within slot 40 there is no lost motion in arms 32 and 48 as they are raised through their zenith and begin their downward journey. Finally, tension is relaxed on cable 42 and third arm 48 settles by gravity to its rest position, supported by arm rest 52 on second arm 32 resting in a horizontal position.

It should be noted that one of the important features of this embodiment is that cable 42 is enclosed for substantially all of its length within tubular second arm 32. This feature protects the cable from the elements and the corrosion which may result therefrom. This is also a safety feature with the tubular arm shielding against the possibility of a cable rupture.

Another important feature is the alignment of slot 41, substantially parallel to second arm 32 to enable the marking disc 56 to float over ground irregularities while not permitting lost motion in the folding of the assembly and thus providing for a smooth, quiet retraction. This alignment also acts to prevent deflection of the second arm 32 when the unit is folded and being transported.

While the invention has been described in connection with a preferred embodiment, it will be understood that it is not intended to limit the invention thereto but it is intended to cover all modifications and alternative constructions falling within the spirit and scope of the invention as expressed in the appended claims.

What is claimed is:

1. An agricultural row marker assembly comprising:
   a base member connectable to a tool bar;
   a first arm pivotally connected to said base member;
   a second arm having a first end, a second end and a tail piece fixed to the first end, said first end pivotally connected to said first arm;
   a third arm pivotally connected to the second end of said second arm and having a row marker device mounted on said third arm;
   a hydraulic cylinder mounted to said base and including an extendable rod;
   a first link having one end pivotally mounted to said extendable rod and another end pivotally mounted to said first arm;
   a second link having one end pivotally mounted to said base and another end having a pin pivotally and slidably mounted in an elongated slot defined in said tail piece, said slot aligned to permit vertical deflection of said row marker when the assembly is fully extended but not permitting lost motion when the assembly is being retracted; and
   a cable having one end fixed to said second link at a point intermediate the two ends of said second link and another end fixed to said third arm whereby extension of said extendable rod urges said first arm into an extended position and applies tension to said cable urging said first, second and third arms into substantially linear alignment.

2. An agricultural row marker assembly as in claim 1 wherein said second arm is of tubular construction and said cable is substantially enclosed by said second arm.

3. An agricultural row marker assembly as in claim 1 wherein said slot is defined substantially parallel to said second arm.

* * * * *